United States Patent
Grant

(10) Patent No.: US 7,640,849 B2
(45) Date of Patent: *Jan. 5, 2010

(54) COOKING APPLIANCE PARTICULARLY USEFUL AS A GRILLING APPLIANCE FOR GRILLING MEAT PRODUCTS

(75) Inventor: Ann Grant, New York, NY (US)

(73) Assignee: AAC Trade Ltd., New York, NY (US)

( * ) Notice: Subject to any disclaimer, the term of this patent is extended or adjusted under 35 U.S.C. 154(b) by 692 days.

This patent is subject to a terminal disclaimer.

(21) Appl. No.: 11/135,331

(22) Filed: May 24, 2005

(65) Prior Publication Data

US 2006/0266346 A1     Nov. 30, 2006

(51) Int. Cl.
*A47J 37/00* (2006.01)
(52) U.S. Cl. .............................. 99/349; 99/353; 99/372; 99/375; 99/378; 99/379; 99/400; 99/425
(58) Field of Classification Search ........... 99/326–333, 99/372–379, 348, 349–351, 444–450, 403–418, 99/352–355, 400, 425; 219/521–525, 492, 219/494, 386; 426/520, 523
See application file for complete search history.

(56) References Cited

U.S. PATENT DOCUMENTS

| | | | |
|---|---|---|---|
| 2,719,903 A | 10/1955 | Oertli | |
| 3,352,227 A | 11/1967 | Litman | |
| 3,524,404 A | 8/1970 | Kimura et al. | |
| 4,601,237 A | 7/1986 | Harter et al. | |
| 4,627,335 A | 12/1986 | Sherman et al. | |
| 4,852,545 A | 8/1989 | Sherman et al. | |
| 5,181,455 A | 1/1993 | Masel et al. | |
| 5,606,905 A | 3/1997 | Boehm et al. | |
| 5,636,564 A * | 6/1997 | Weiss | 99/332 |
| 5,755,150 A | 5/1998 | Matsumoto et al. | |
| 5,768,994 A * | 6/1998 | Bobo | 99/374 |
| 5,791,234 A | 8/1998 | Newton et al. | |
| 5,937,742 A * | 8/1999 | Steeb et al. | 99/375 |
| 5,970,851 A | 10/1999 | Masel et al. | |
| 6,003,436 A | 12/1999 | Masel et al. | |

(Continued)

FOREIGN PATENT DOCUMENTS

EP     1020153     7/2000

(Continued)

OTHER PUBLICATIONS

Official Action Dated Feb. 9, 2009 From the US Patent and Trademark Office Re.: U.S. Appl. No. 11/329,064.

*Primary Examiner*—Timothy F. Simone

(57) ABSTRACT

A cooking appliance includes a base, and lower and upper cooking plates pivotally mounted to the base such as to permit: (a) the upper cooking plate to be pivotted to an open position with respect to the lower cooking plate for introducing and removal of food articles between the cooking surfaces of the two cooking plates; (b) the upper cooking then to be pivotted to a closed position with respect to the lower cooking plate for contacting the food article between the cooking surfaces of the two cooking plates; and (c) both plates to be pivotted to any desired angular position with respect to the base for drawing fluids from the food article while being cooked between the cooking surfaces of the two cooking plates.

19 Claims, 4 Drawing Sheets

U.S. PATENT DOCUMENTS

| | | | |
|---|---|---|---|
| 6,012,380 A | 1/2000 | Hermansson | |
| 6,016,741 A | 1/2000 | Tsai et al. | |
| 6,109,169 A | 8/2000 | Masel et al. | |
| 6,167,796 B1 * | 1/2001 | Wright et al. | 99/332 |
| 6,192,788 B1 | 2/2001 | Benedictus et al. | |
| 6,257,126 B1 * | 7/2001 | Veljkovic et al. | 99/349 |
| 6,321,639 B1 | 11/2001 | Misceo | |
| 6,397,730 B1 | 6/2002 | Steinbach et al. | |
| 6,439,108 B1 | 8/2002 | Wu | |
| 6,595,116 B1 | 7/2003 | Lin | |
| 6,782,804 B1 | 8/2004 | Lin | |
| 7,021,199 B2 * | 4/2006 | Lubowicki et al. | 99/372 |
| 7,109,442 B2 | 9/2006 | Steinberg et al. | |
| 2004/0216730 A1 | 11/2004 | Sawhney et al. | |
| 2006/0266346 A1 | 11/2006 | Grant | |
| 2007/0157823 A1 | 7/2007 | Cohen et al. | |

FOREIGN PATENT DOCUMENTS

| | | |
|---|---|---|
| FR | 2623705 | 6/1989 |
| JP | 2008093410 A * | 4/2008 |
| WO | WO2006/126064 | 11/2006 |

* cited by examiner

COOKING APPLIANCE PARTICULARLY USEFUL AS A GRILLING APPLIANCE FOR GRILLING MEAT PRODUCTS

FIELD AND BACKGROUND OF THE PRESENT INVENTION

The present invention relates to cooking appliances in which food articles are cooked between cooking surfaces of two cooking plates. The invention is particularly useful in grilling appliances for grilling meat, and is therefore described below with respect to this application.

Many different types of electrical grilling appliances have been developed and are described in the patent literature, as shown, for example by U.S. Pat. Nos. 5,181,455, 5,606,905, 6,016,741 and 6,192,788. However, efforts are continuously being made for health reasons to more efficiently remove grease and other fluids emanating from the food article during its grilling, and/or for reducing the grilling time, as well as for more conveniently controlling the grilling process.

OBJECTS AND BRIEF SUMMARY OF THE PRESENT INVENTION

An object of the present invention is to provide a cooking appliance in general, and a grilling appliance in particular, having advantages in one or more of the above respects.

According to one aspect of the present invention, there is provided a cooking appliance, comprising: a base for supporting the grill appliance on a flat horizontal surface; a lower grill plate pivotally mounted by a pivotal mounting on said base to a desired angular position with respect thereto; an upper grill plate pivotally mounted on the base over the lower grill plate to a desired angular position with respect to the lower grill plate and the base; said grill plate being formed with ribs defining channels for draining fluids from the food article to one of the edges of the grill plates; and an electrical heater for heating the two grill plates. The pivotal mountings of the lower and upper grill plates are such as to permit: (a) the upper grill plate to be pivotted to an open position with respect to the lower grill plate for introducing and removing of food articles between the two grill plates; (b) the upper grill plate then to be pivotted to a closed condition with respect to the lower grill plate for contacting the food article between the two grill plates; and (c) both plates in their closed condition to be pivotted to any desired angular position with respect to the base for draining fluids from the food article while being cooked between the two grill plates.

As will be described more particularly below, such a cooking appliance can cook (e.g. grill) the food articles in a minimum of time since it brings the heating surfaces of two cooking plates into direct with the opposite sides of the food article. Moreover, since the appliance enables the food articles to be cooked between the two cooking plates at any desired angular position of the cooking plates with respect to the base, the appliance can be used for removing, efficiently and to a relatively high degree, grease and other fluids emanating from the food articles during the cooking process.

According to another aspect of the present invention, there is provided a grill appliance, comprising: a base for supporting the grill appliance on a flat horizontal surface; a lower grill plate mounted on the base; an upper grill plate pivottably mounted on the base over the lower grill plate to a desired angular position with respect to the lower grill plate; an electrical heater for heating the grill surfaces of the two grill plates; and a motor drive for driving at least the upper grill plate to a desired angular position, such as to permit: (a) the upper grill plate to be pivotted to an open position with respect to the lower grill plate for introducing and removing food articles between the two grill plates; and (b) the upper grill plate then to be pivotted to a closed condition with respect to the lower grill plate for contacting the food article between the two grill plates as the article is being cooked.

The appliance further comprises an electrical control panel including manipulatable elements for controlling the motor drive, for pre-selecting the heating time of the electrical heater, and for pre-heating the cooking plates if desired. Such features enable the described appliance to be conveniently controlled by the user.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

Figure 1:
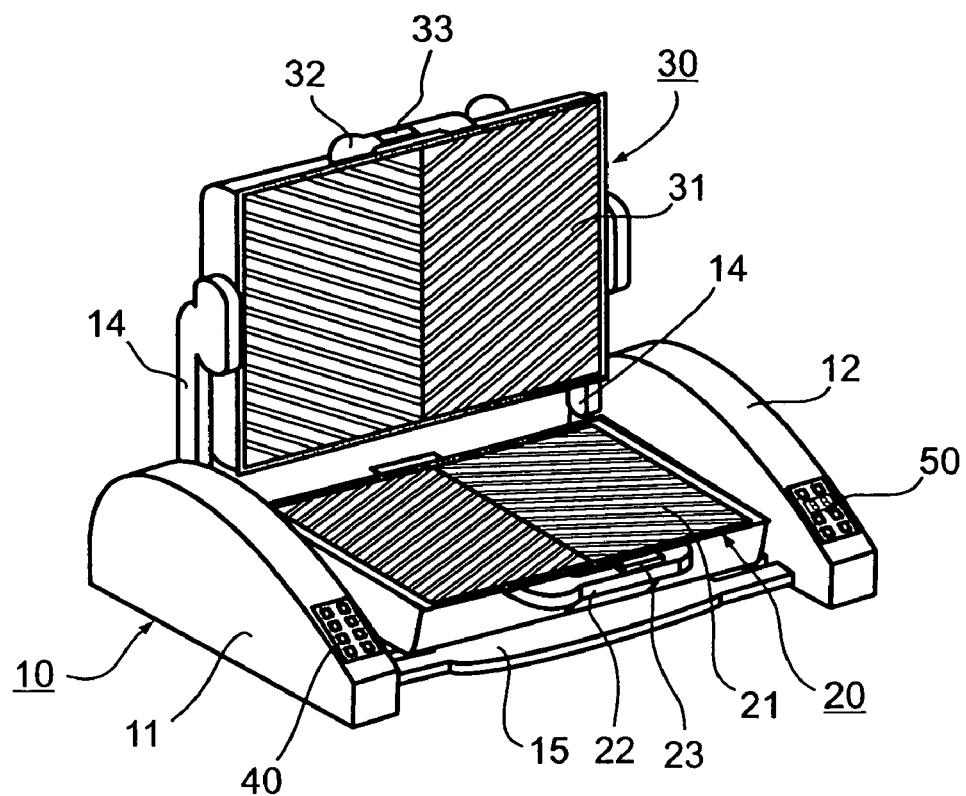
FIG. 1 is a pictorial view illustrating one form of cooking appliance constructed in accordance with the present invention.

As shown particularly in FIG. 1, the illustrated cooking appliance includes a base, generally designated 10, for stably supporting the cooking appliance on a flat horizontal surface. Base 10 includes side walls 11, 12 at its opposite sides having a first pair of arms 13 (FIG. 4) pivotally mounting a lower cooking plate 20, and a second pair of arms 14 for pivotally mounting an upper cooking plate 30.

As shown particularly in FIG. 1, the two side walls 11, 12 are inclined at their front ends. A control panel 40 is mounted on the inclined front portion of side wall 11, and a display panel 50 is mounted on the inclined front portion of side wall 12, such as to permit convenient control of the appliance.

As shown particularly in FIG. 1, the lower cooking plate 20 is designed as a grill plate. It is provided with an upper surface 21 formed with a plurality of ribs defining channels for draining grease and other fluids emanating from the food article while it is being grilled. The upper cooking plate 30 is also designed as a grill plate and is also formed on its lower surface with ribs 31 defining similar channels for draining the liquid and other fluids from the food articles being cooked.

Figure 4:
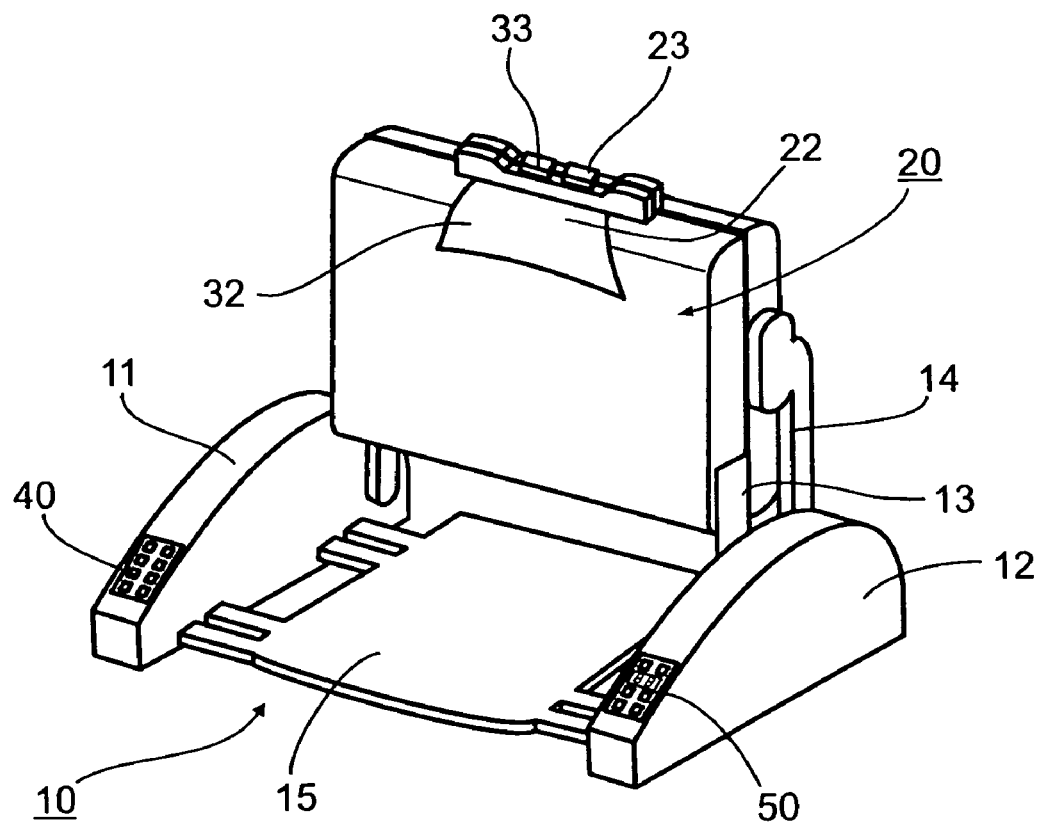
FIG. 4 illustrates the cooking appliance of FIG. 1 in a vertical cooking position to maximize the drainage of grease and other fluids emanating from the food article being cooked.
Figure 5:
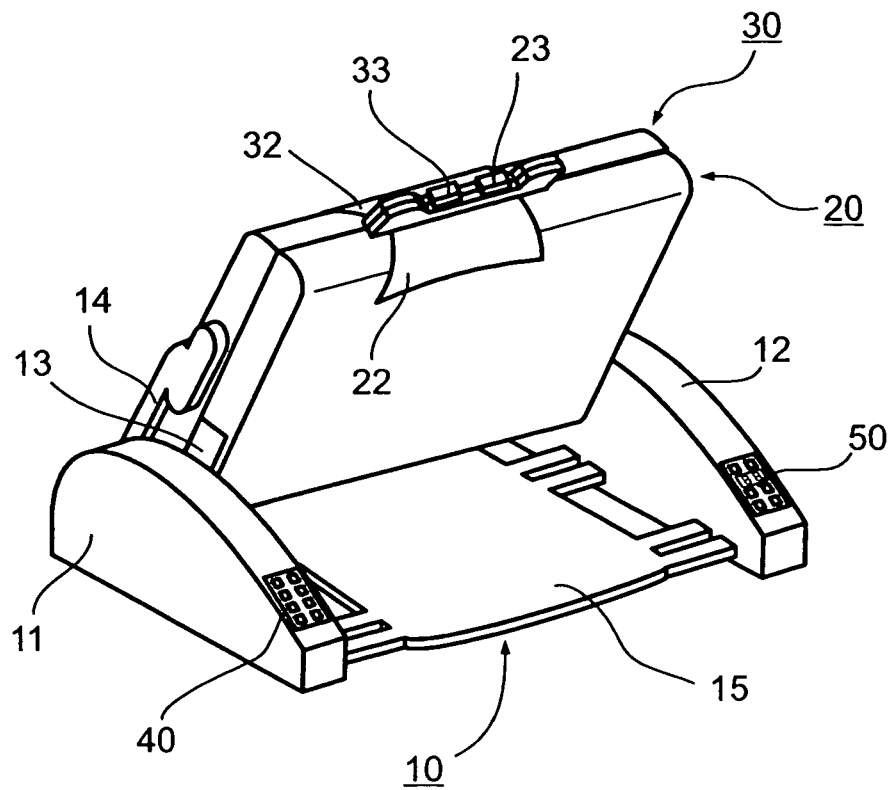
FIG. 5 illustrates the cooking appliance in an intermediate cooking position to decrease drainage of grease and other fluids if so desired.

As seen in FIG. 1, the ribs 21 and 31 are oriented such that when the two grill plates 20, 30 are pivotted to a vertical or partially-vertical position, as shown in FIGS. 4 and 5, respectively, the grease and other fluids emanating from the food articles being grilled are channeled downwardly towards the center region of the rear edge of the two grill plates. Base 10 supports a drip tray 15 (FIGS. 4 and 5) in the center region, to catch the drippings from the two grill plates 20, 30 during the grilling process. Drip tray 15 is preferably removable from base 10 to facilitate cleaning.

The two grill plates 20, 30, each includes a handle 22 and 32, respectively, at their front portions manually graspable by the user to manually pivot the two plates as desired. When the two plates are pivotted to their closed condition, e.g. shown in FIGS. 3-5, with the food article between their grill surfaces, the two plates are releasable retained in the closed position by latching elements 23, 33, carried at the front ends of the two grill plates 20, 30.

To facilitate the use of the illustrated appliance, it also includes a motor drive for driving the two grill plates 20, 30, to their desired pivotal positions. Each grill plate may be driven by a separate drive motor, or the appliance could be provided with a single drive motor selectively coupleable to the two grill plates. Control of the electric motor or motors, as well as of the electrical heater heating the grill plates, is effected via control panel 40 and display panel 50 carried at the front portions of the two side walls 11, 12.

Figure 6:
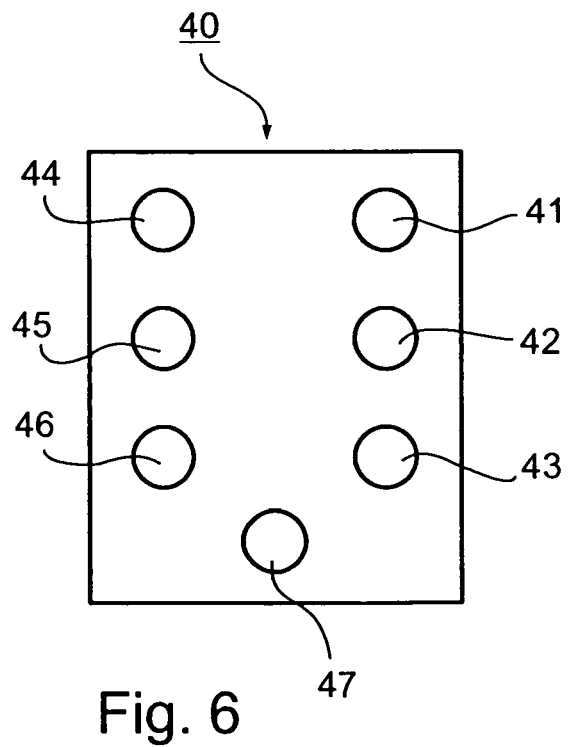
FIG. 6 illustrates the control panel in the cooking appliance of FIG. 1.
Figure 7:
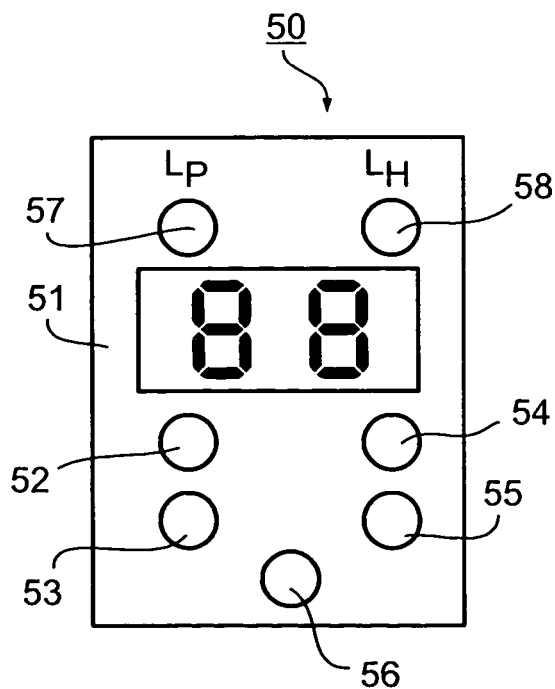
FIG. 7 illustrates the display panel in the cooking appliance of FIG. 1.
Figure 8:
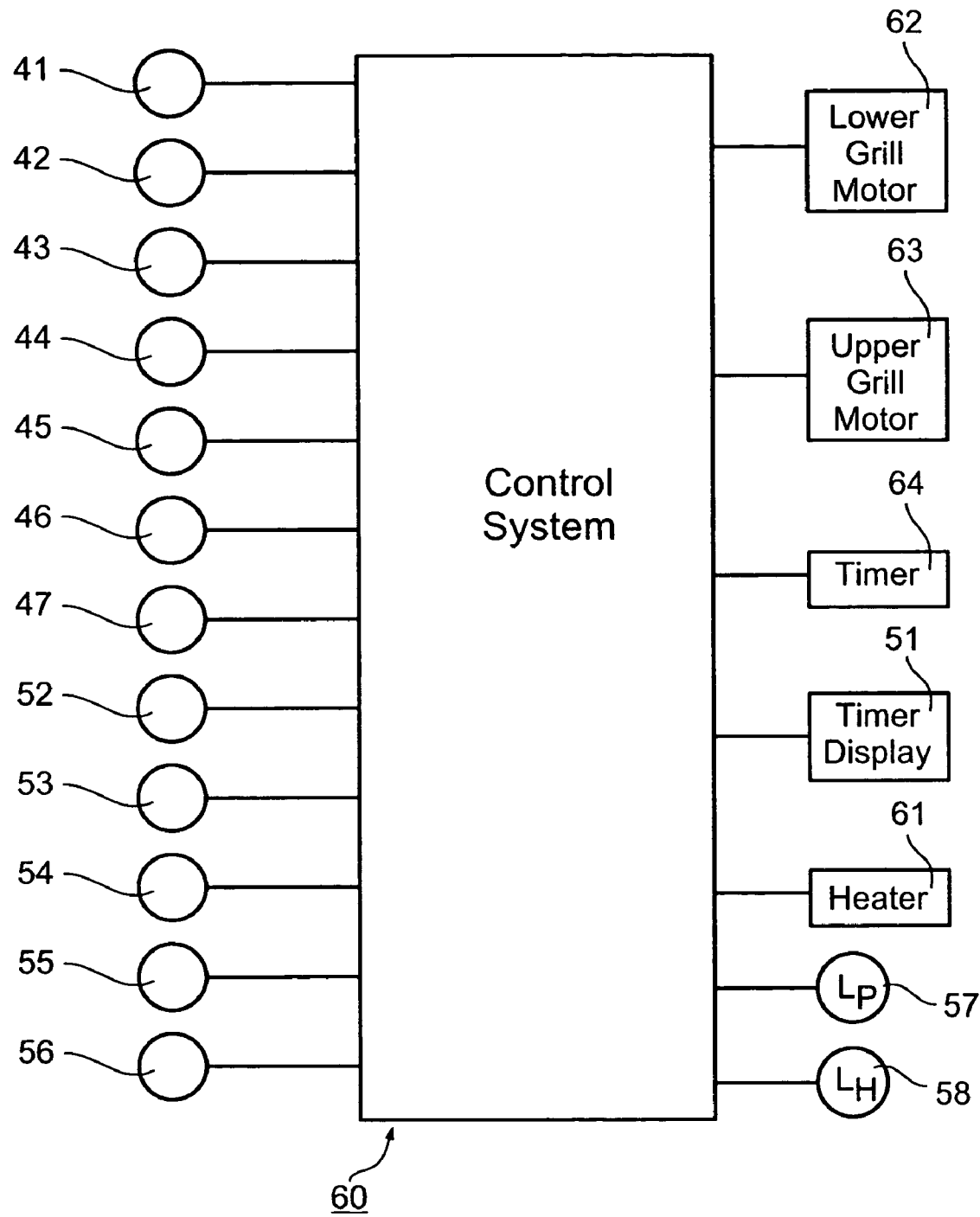
FIG. 8 is a block diagram illustrating the overall control system in the cooking appliance of FIG. 1.

Control panel 40 and display panel 50 are more particularly illustrated in FIGS. 6 and 7. FIG. 8 illustrates the overall electrical control system.

Thus, as shown in FIG. 6, control panel 40 includes a number of manipulatable elements, in the form of depressible keys 41-47, for controlling the motor or motors driving the two grill plates 20, 30, to their various possible positions, as described below, according to the grilling operation desired in any particular case.

Display panel 50, as shown in FIG. 7, includes a window 51 for displaying the time of grilling, which may be preset by an Up-Time key 52 and a Down-Time key 53. Display panel 50 further includes additional depressible keys 54-56 which may be used for controllably pre-heating the grill plates, if desired. Control panel 50 also includes indicator lights 57, 58 for indicating power-on by indicator $L_p$, and heat-on by indicator $L_h$, respectively.

The overall electrical control system is schematically shown in FIG. 8, and therein generally designated 60. Thus, it includes inputs from the various control keys in control panel 40 as illustrated in FIG. 6, and the various control keys in display panel 50 as shown in FIG. 7. These inputs are used by the control system to control the timer display 51, the Power-On indicator 57, and the Heat-On indicator 58 as briefly described above. Control system 60 also control the heaters 61 for both grill plates 20, 30, motor 62 for the lower grill plate 20, motor 63 for the upper grill plate 30, and the timer control 64 which controls the time displayed within display 51.

The manner of operating the illustrated electrical grilling appliance will be apparent from the above description.

Figure 2:
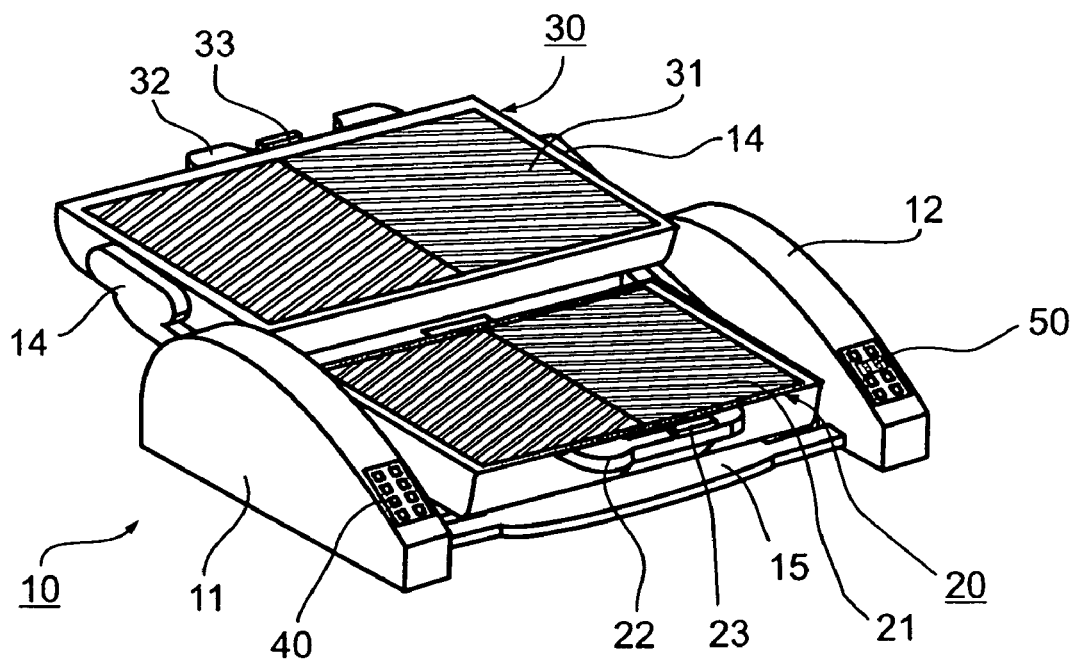
FIG. 2 illustrates the cooking appliance of FIG. 1 in its fully open condition for receiving or removing food articles.
Figure 3:
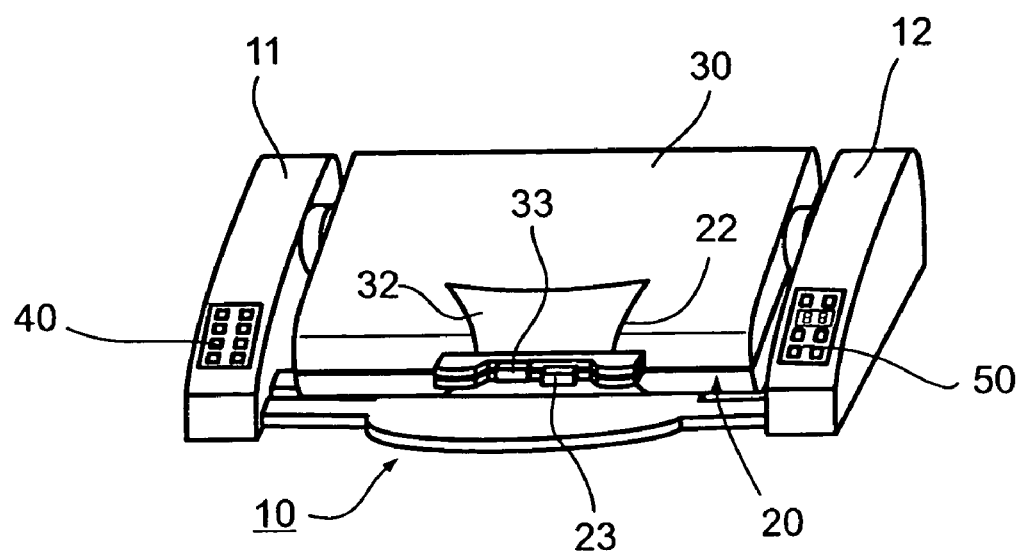
FIG. 3 illustrates the cooking appliance of FIG. 1 in its fully closed condition after receiving the food articles to be cooked.

Thus, the two grill plates 20, 30, may be pivotted to an open position as shown in FIG. 1 or FIG. 2 to permit placing the food articles to be grilled on top of the lower grill plate 20. After the food article is so placed, the upper grill plate 30 may be pivotted to its closed condition, as shown in FIG. 3, such that the food article is firmly contacted between the grill surfaces 21, 31 of the two grill plates. The two grill plates, while in the closed condition, may then be pivotted to any desired inclination according to the amount of grease and other fluids to be drained from the food articles being grilled. For example, if it is desired to effect maximum drainage, the two grill plates would be pivotted to their vertical positions, as shown in FIG. 4, with respect to the base 10 so as to exploit drainage by gravity to a maximum extent. If something less than maximum removal of the grease is desired, the two grill plates 20, 30 may be pivotted to some intermediate position, e.g. as shown in FIG. 5, whereupon the drainage by gravity would be to a lesser degree than when the plates are pivotted to the vertical position illustrated in FIG. 4. If minimum removal of such liquids is desired, the two grill plates could be retained in their horizontal position with respect to base 10 as shown in FIG. 3, whereupon the grease and other liquids separating from the food articles would accumulate in the channels defined by the grill surfaces 21, 31 of the grill plates.

In any position involving gravity drainage, the draining liquids are channeled by rib surfaces 21, 31 of the two grill plates 20, 30 towards the center region of the lower edge of the two grill plates, and from there, into the drip tray 15 underlying the two grill plates.

It will thus be seen that the described appliance drains the grease and other liquids from the food articles being grilled in an efficient manner, because of the use of gravity, and also in a manner which may be selectively controlled by pre-selecting the inclination of the two grill plates with respect to the base during the grilling operation. In addition, since the grilling is effected between two grill plates in contact with the food articles, a minimum grilling time is required. The above-described electrical controls also permit the grilling operation to be performed very conveniently.

While the invention has been described with respect to a grilling appliance, it will be appreciated that the invention could also be implemented in other types of cooking appliances, where food articles, including non-meat food products, are to be cooked between two cooking surfaces. Many other variations, modifications and applications of the invention will be apparent.

What is claimed is:

1. A cooking appliance, comprising:

a base for supporting the cooking appliance on a flat horizontal surface;

a lower grill plate pivotally mounted by a pivotal mounting on said base to a desired angular position with respect thereto;

an upper grill plate pivotally mounted by a pivotal mounting on said base over said lower grill plate to a desired angular position with respect to said lower grill plate and said base;

said grill plates being formed with ribs defining channels for draining fluids from the food article to one of the edges of the grill plates;

and an electrical heater for heating the two grill plates;

the pivotal mountings of the lower and upper grill plates to the base being such as to permit: (a) the upper grill plate to be pivotted to an open position with respect to the lower grill plate for introducing and removing food articles between the two grill plates; (b) the upper cooking plate then to be pivotted to a closed condition with respect to the lower grill plate for contacting the food article between the two grill plates; and (c) both plates in said closed condition to be pivotted to any desired angular position with respect to the base for draining fluids from the food article while being cooked between the two grill plates.

2. The cooking appliance according to claim 1, wherein said ribs in the lower and upper grill plates define channels for draining the fluids to the rear edges of the grill plates.

3. The cooking appliance according to claim 2, wherein said ribs in the grill plates define channels for draining the fluids from the food article towards said central region of the rear edges of the two grill plates, and wherein said base includes a drip tray underlying said central region for receiving the fluids drained from the food articles.

4. The cooking appliance according to claim 3, wherein said drip tray is removable from said base.

5. The cooking appliance according to claim 1, wherein said lower grill plate and said upper grill plate each includes a handle for manually pivoting each plate to the desired angular position.

6. The grill appliance according to claim 1, wherein said appliance further comprises a motor drive for separately driving said lower grill plate and said upper grill plate to their desired angular positions.

7. The grill appliance according to claim 6, wherein said appliance further comprises an electrical control panel including manipulatable elements for controlling said motor drive.

8. The grill appliance according to claim 7, wherein said control panel further includes a manipulatable element for presetting the heating time of the electrical heater.

9. The grill appliance according to claim 8, wherein said control panel further includes a manipulatable element for pre-heating the grill plates.

10. The grill appliance according to claim 7, wherein said base includes side walls on opposite sides of lower and upper grill plates, and said control panel is mounted on one of said side walls.

11. The cooking appliance according to claim 10, wherein said appliance further comprises a display panel mounted on the other of said side walls.

12. A cooking appliance, comprising:
 a base for supporting the cooking appliance on a flat horizontal surface;
 a lower grill plate mounted on said base;
 an upper grill plate pivottably mounted on said base over said lower grill plate and to be to a desired angular position with respect to said lower grill plate;
 an electrical heater for heating the two lower and upper grill plates;
 a motor drive for driving at least said upper grill plate to a desired angular position, such as to permit: (a) the upper grill plate to be pivotted to an open position with respect to the lower grill plate for introducing and removing food articles between the two grill plates; and (b) the upper grill plate to be pivotted to a closed condition with respect to the lower grill plate for contacting the food article between the two grill plates as the article is being cooked; and an electrical control panel including manipulatable elements for controlling said motor drive; and wherein said appliance further comprises and an electrical control panel including manipulatable elements for controlling said motor drive.

13. The cooking appliance according to claim 12, wherein said control panel further includes a manipulatable element for presetting the heating time of the electrical heater.

14. The cooking appliance according to claim 13, wherein said control panel further includes a manipulatable element for pre-heating the cooking plates.

15. The cooking appliance according to claim 12, wherein base includes side walls on opposite sides of said lower and upper grill plates, and said control panel is mounted on one of said side walls.

16. The cooking appliance according to claim 15, wherein said appliance further comprises a display panel mounted on the other side of said side walls.

17. The cooking appliance according to claim 12, wherein said lower grill plate is also pivotally mounted on said base to a desired angular position with respect thereto; and wherein said motor drive also drives said lower grill plate to a desired angular position, such as also to permit: (c) both grill plates in said closed condition to be pivotted to any desired angular position with respect to the base for draining fluids from the food article while being cooked between the two grill plates.

18. The cooking appliance according to claim 17, wherein said upper and lower grill plates are formed with ribs defining channels for drawing the fluids from the food article while being cooked to the rear edge of the two grill plates, said base including a drip tray underlying said rear edge for receiving the fluids drawn therefrom.

19. The cooking appliance according to claim 18, wherein said lower grill plate and said upper grill plate each includes a manually graspable handle for manually pivotting each plate to the desired angular position.

\* \* \* \* \*